United States Patent [19]
Gallegos

[11] Patent Number: 5,732,975
[45] Date of Patent: Mar. 31, 1998

[54] LUMINESCENT SEAT BELTS

[76] Inventor: Gilbert F. Gallegos, P.O. Box 104, Ponderosa, N. Mex. 87044

[21] Appl. No.: 723,782

[22] Filed: Sep. 30, 1996

[51] Int. Cl.⁶ .................................................. B60R 22/00
[52] U.S. Cl. .................................... 280/808; 297/482
[58] Field of Search ..................... 280/808, 801.1; 297/482, 483, 468

[56] References Cited

U.S. PATENT DOCUMENTS

| | | | |
|---|---|---|---|
| 4,192,530 | 3/1980 | Cachia | 280/808 |
| 4,678,205 | 7/1987 | Wold | 280/808 |
| 4,795,190 | 1/1989 | Weightman et al. | 280/808 |
| 4,969,663 | 11/1990 | Nowacki | 280/808 |
| 5,472,235 | 12/1995 | Dubay | 280/808 |

FOREIGN PATENT DOCUMENTS 2186612  8/1987  United Kingdom ............ 297/482

*Primary Examiner*—Peter C. English

[57] ABSTRACT

Luminescent Seat Belts for enabling law enforcement agency personnel to quickly determine if the operator and passengers of a motor vehicle are wearing restraint belts. The inventive device includes a conventional seat belt system having a luminescent surface or covering.

1 Claim, 3 Drawing Sheets

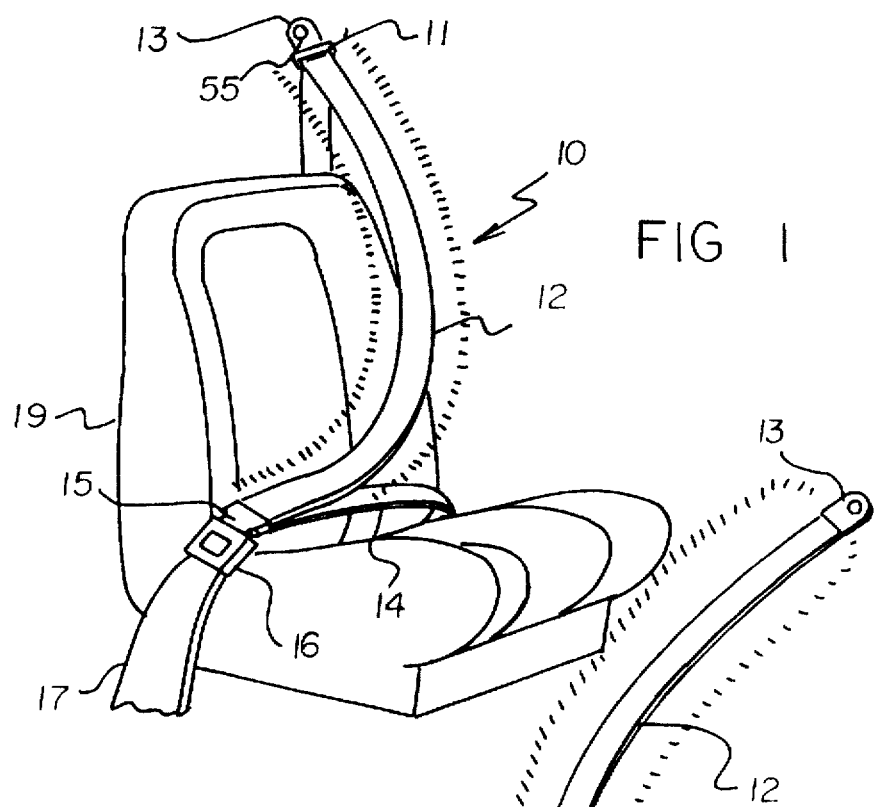
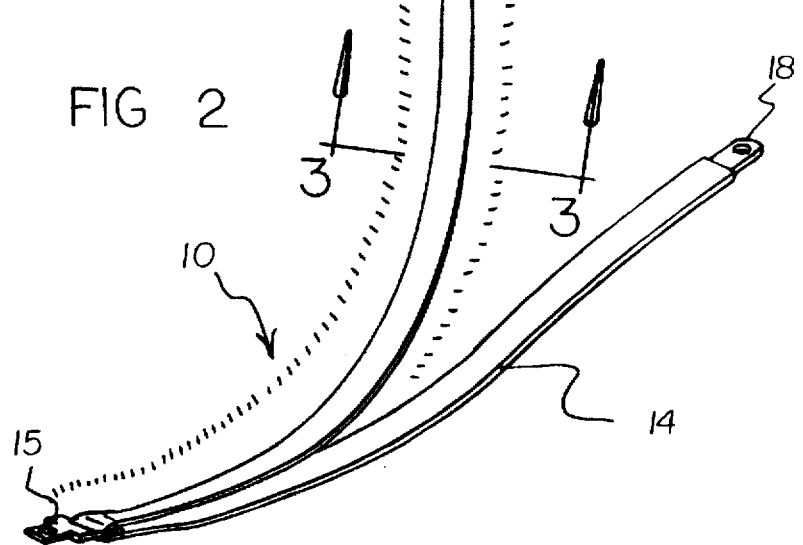

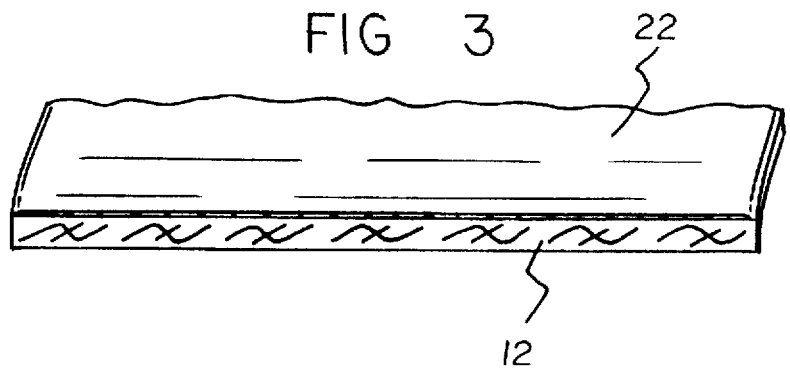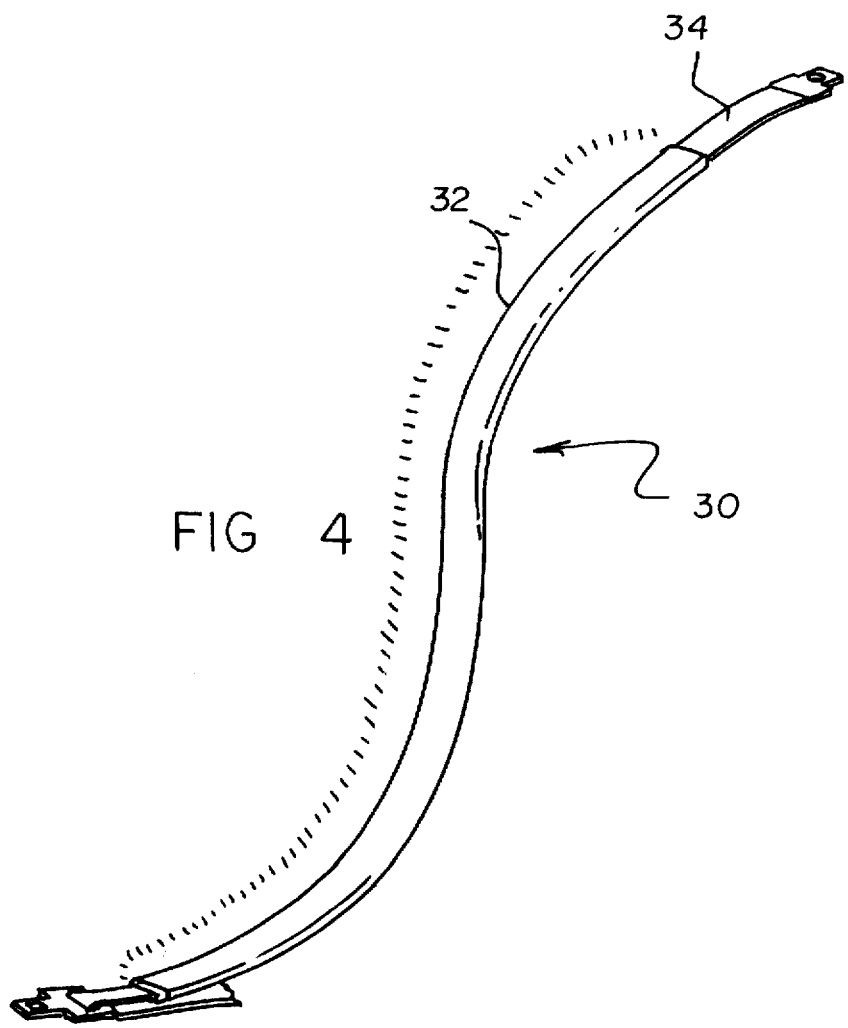

LUMINESCENT SEAT BELTS

BACKGROUND OF THE INVENTION

1. Field of the Invention

The present invention relates to vehicle occupant restraint belt systems and more particularly pertains to new Luminescent Seat Belts for enabling law enforcement agency personnel to quickly determine if the operator and passengers of a motor vehicle are wearing restraint belts.

2. Description of the Prior Art

The use of vehicle occupant restraint belt systems is known in the prior art. More specifically, vehicle occupant restraint belt systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle occupant restraint belt systems include U.S. Pat. No. 4,365,285; U.S. Pat. No. 4,951,965; and U.S. Pat. No. 5,123,673.

While these devices fulfill their respective, particular objectives and requirements, the aforementioned patents do not disclose new Luminescent Seat Belts. The inventive device includes a conventional seat belt system having a luminescent surface or covering.

In these respects, the Luminescent Seat Belts according to the present invention substantially depart from the conventional concepts and designs of the prior art, and in so doing provide an apparatus primarily developed for the purpose of enabling law enforcement agency personnel to quickly determine if the operator and passengers of a motor vehicle are wearing restraint belts.

SUMMARY OF THE INVENTION

In view of the foregoing disadvantages inherent in the known types of vehicle occupant restraint belt systems now present in the prior art, the present invention provides new Luminescent Seat Belt constructions wherein the same can be utilized for enabling law enforcement agency personnel to quickly determine if the operator and passengers of a motor vehicle are wearing restraint belts.

The general purpose of the present invention, which will be described subsequently in greater detail, is to provide new Luminescent Seat Belts apparatus and method which have many of the advantages of the vehicle occupant restraint belt systems mentioned heretofore and many novel features that result in new Luminescent Seat Belts which are not anticipated, rendered obvious, suggested, or even implied by any of the prior art vehicle occupant restraint belt systems, either alone or in any combination thereof.

To attain this, the present invention generally comprises a conventional seat belt system having a luminescent surface or covering.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new Luminescent Seat Belts apparatus and method which have many of the advantages of the vehicle occupant restraint belt systems mentioned heretofore and many novel features that result in new Luminescent Seat Belts which are not anticipated, rendered obvious, suggested, or even implied by any of the prior art vehicle occupant restraint belt systems, either alone or in any combination thereof.

It is another object of the present invention to provide new Luminescent Seat Belts which may be easily and efficiently manufactured and marketed.

It is a further object of the present invention to provide new Luminescent Seat Belts which are of a durable and reliable construction.

An even further object of the present invention is to provide new Luminescent Seat Belts which are susceptible of a low cost of manufacture with regard to both materials and labor, and which accordingly are then susceptible of low prices of sale to the consuming public, thereby making such Luminescent Seat Belts economically available to the buying public.

Still yet another object of the present invention is to provide new Luminescent Seat Belts which provide in the apparatuses and methods of the prior art some of the advantages thereof, while simultaneously overcoming some of the disadvantages normally associated therewith.

Still another object of the present invention is to provide new Luminescent Seat Belts for enabling law enforcement agency personnel to quickly determine if the operator and passengers of a motor vehicle are wearing restraint belts.

Yet another object of the present invention is to provide new Luminescent Seat Belts which include a conventional seat belt system having a luminescent surface or covering.

Still yet another object of the present invention is to provide new Luminescent Seat Belts that encourage operators and passengers of vehicles to wear their seat belts.

Even still another object of the present invention is to provide new Luminescent Seat Belts that encourage operators and passengers to obey seat belt laws.

Even still another object of the present invention is to provide new Luminescent Seat Belts that save lives.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a left side perspective view of a new Luminescent Seat Belt according to the present invention showing the seat belt installed on a vehicle seat.

FIG. 2 is a left side perspective view thereof.

FIG. 3 is cross sectional view taken along line 3—3 of FIG. 2.

FIG. 4 is a perspective view of an alternative embodiment of the present invention.

DESCRIPTION OF THE PREFERRED EMBODIMENT

Figure 5:
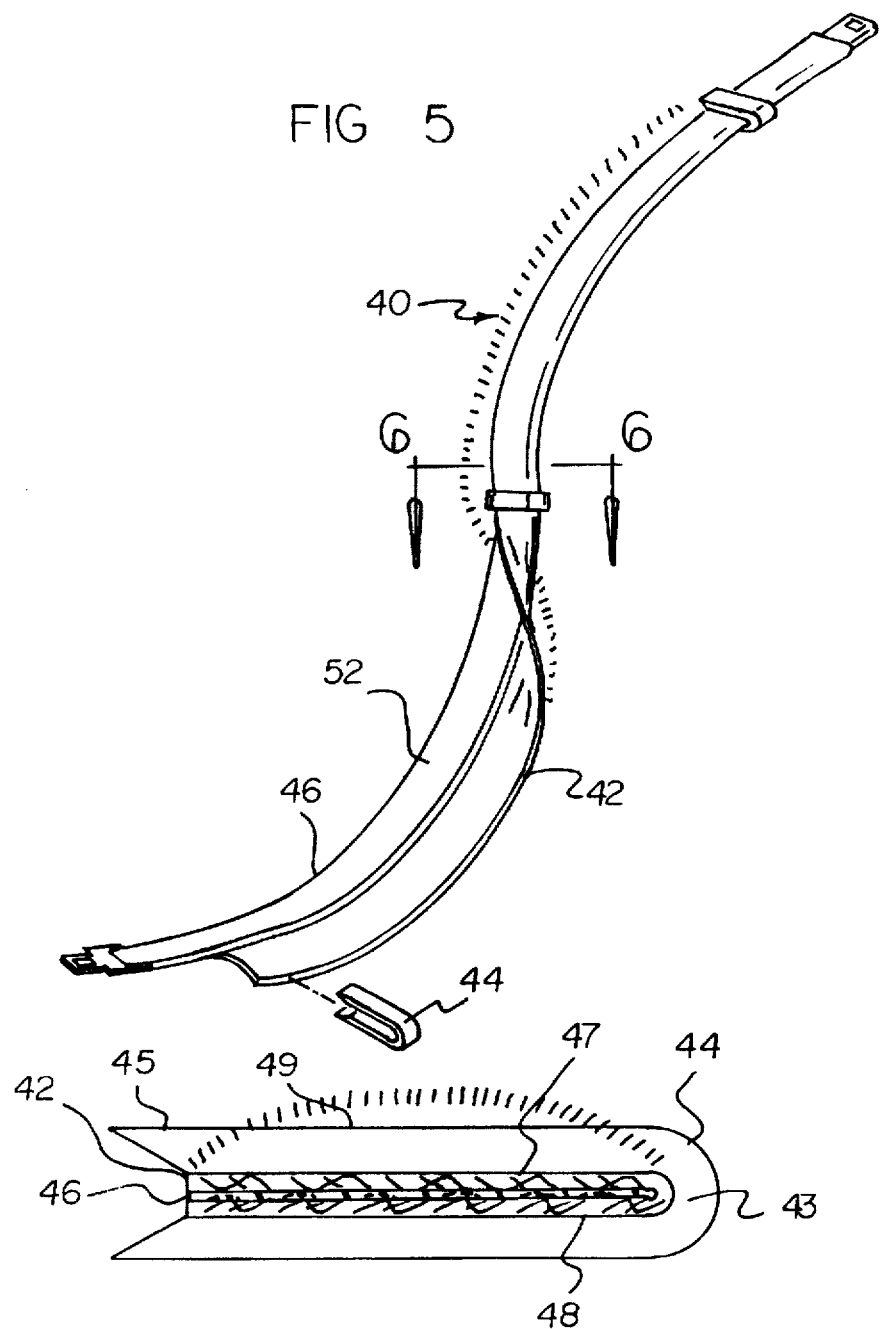
FIG. 5 is a perspective view of yet another embodiment of the present invention.

With reference now to the drawings, and in particular to FIGS. 1 through 6 thereof, new Luminescent Seat Belts embodying the principles and concepts of the present invention and generally designated by the reference numerals 10, 30, 40 will be described.

More specifically, it will be noted that the Luminescent Seat Belts 10, 30, 40 comprises a conventional seat belt system having a luminescent surface or covering.

With reference to FIG. 1, it can be shown that a conventional vehicle seat belt system for use with a vehicle seat 19 comprises a shoulder strap 12, a waist strap 14, a buckle 15, a keeper 16 and a keeper strap 17. Also shown are shoulder strap attachment means 13 including an aperture 55 and shoulder strap loop 11. A waist strap attachment means 18 is shown in FIG. 2 and includes a waist strap aperture 56.

With reference to FIG. 3, an orange luminescent cover 22 fabricated from a luminescent material is shown attached to the shoulder strap 12. The orange luminescent cover 22 can be attached by means of stitching or other suitable means and is positioned on the shoulder strap so that when the shoulder strap 12 is worn the luminescent cover faces outwardly (FIG. 1).

With reference to FIG. 4, an alternative embodiment 30 of the present invention is shown including an orange luminescent sleeve 32 which encloses a shoulder strap 34.

Figure 6:
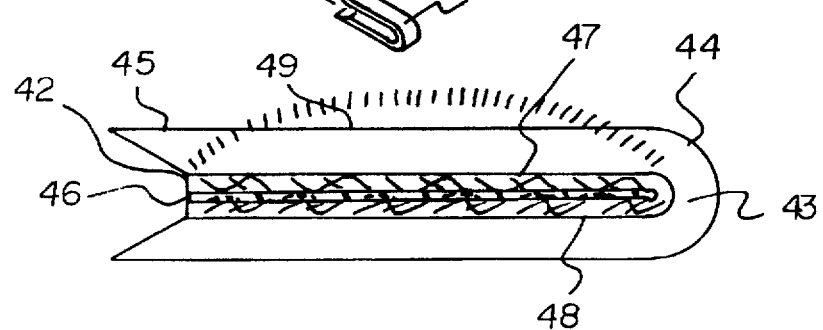
FIG. 6 is a cross sectional view taken along line 6—6 of FIG. 5.

With reference to FIG. 5, yet another embodiment 40 of the present invention is shown including an orange luminescent flap 42 that is clipped to a shoulder strap 46 by means of at least two clips 44. The clips 44 have arms 49 having first ends 43 and second ends 45, the first ends 43 being attached and the second ends 45 being open (FIG. 6). The orange luminescent flap 42 further includes a luminescent section 47 and a non-luminescent section 48, the luminescent section 47 being attached to an outwardly facing surface 52 of the shoulder strap 46 and the non-luminescent section 48 being attached to an inwardly facing surface (not shown).

In use, the operator and passengers of a vehicle buckle the seat belt buckle 15 into the keeper 16. In the case of the orange luminescent flap 42, it is attached to the shoulder strap 46 by means of clips 44 which secure the luminescent section 47 to the outwardly facing surface 52 of the shoulder strap 46 and the non-luminescent section 48 to the inwardly facing surface of the shoulder strap 46.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A luminescent seat belt cover for use with a vehicle occupant restraint seat belt having a waist strap and a shoulder strap, said seat belt cover comprising:

luminescent seat belt cover means for covering at least a portion of the seat belt; said cover means comprising an elongate cover flap being divided into two substantially equal longitudinally extending sections located on opposite lateral sides of a longitudinal axis of said cover flap, one of said sections being non-luminescent and the other of said sections being luminescent such that folding of said cover flap along said longitudinal axis produces one non-luminescent face for placing against the body of the occupant and an opposite luminescent face for facing outward from the body of the occupant; and at least two U-shaped cover flap retaining clips for removably securing said cover flap to the seat belt, each of said retaining clips having parallel arms receiving therebetween the two sections of the cover flap longitudinally folded over the seat belt, said parallel arms holding said cover flap in place on the seat belt.

* * * * *